United States Patent Office 3,242,221
Patented Mar. 22, 1966

3,242,221
ALKYLATION OF AROMATICS WITH ALCOHOLS
Stephen M. Kovach, Highland, Ind., and Glenn O. Michaels, Park Forest, Ill., assignors to Sinclair Research, Inc., Wilmington, Del., a corporation of Delaware
No Drawing. Filed Nov. 1, 1961, Ser. No. 149,203
2 Claims. (Cl. 260—671)

This invention relates to the alkylation of aromatics with alkylating agents and is particularly concerned with a catalytic alkylation process employing a steam-treated alkylation catalyst. Alkylated aromatics are of value in many fields and some are particularly desirable as constituents of high octane aviation fuels and as sources of synthetic detergents.

Although catalytic processes for the alkylation of aromatics have been suggested, for instance, see U.S. Patents Nos. 2,384,505 and 2,542,190, the present process provides good utilization of alkylating agents, low carbon laydown on the catalyst, good catalyst aging characteristics, low disproportionation or isomerization, and a readily regenerable catalyst.

It has now been found that steam-treatment of a silica-based catalyst results in an alkylation catalyst that reduces coke deposition several fold without reducing the utilization of the alkylating agent. In addition, the steam pretreated catalysts have greatly improved catalyst life. The silica-based catalyst is steam-treated at elevated temperatures, generally from about 1000 to 1600° F., preferably about 1200 to 1500° F. The extent of steam treatment is ordinarily in excess of about 30 minutes and preferably from about 24 to 48 hours. There is apparently little benefit to be obtained by steam-treating the catalyst in excess of about 100 hours. The catalyst can be treated with steam per se or steam diluted with about 0 or 1 to 90 or more volume percent of an inert gas, e.g., air, nitrogen and methane, alone or in admixture. Thus the partial pressure of the steam in the inert gas will generally range from about 10 to 100% but preferably is about 10 to 50%. The total pressure is preferably ambient, e.g., atmospheric, and can be elevated, for instance, up to about 2000 p.s.i.g. or more, however, no particular advantage has been associated with the use of high pressures in view of the expense of pressure equipment and possible sintering of the catalyst when treated over prolonged periods of time at high temperatures and pressures.

A specific method of steam treating the catalyst involves charging a silica-alumina catalyst having an initial surface area of 600 m.$^2$/gm. into 1″ Universal reactor. The temperature is raised to 1250° F. and steam is passed over the catalyst at a rate of 20 grams per hour. At the end of 1 hour, the surface area has decreased to about 400 m.$^2$/gm. At the end of 35 hours, the surface area has decreased to about 202 m.$^2$/gm. At this point the catalyst is removed from the steam atmosphere and is ready for use in the alkylation of the present invention.

The alkylation catalysts which are advantageously steam-treated in accordance with the present invention are silica-based or silica-containing catalysts and include synthetic gel-type catalysts, for instance those disclosed in U.S. Patents Nos. 2,384,505 and 2,542,190, hereby incorporated by reference, and clay catalysts. These catalysts are acidic, solid, mixed oxide hydrocarbon cracking catalysts. Advantageously we employ calcined silica-containing catalysts, for instance, containing a major proportion of, or a predominant amount of, for instance at least about 50 percent of, silica. A silica-based catalyst can include solid metal oxide or mixed solid oxides of metals or non-metals.

Alumina-silica catalysts represent the preferred class of catalyst because of their low cost, regenerability, high rate of conversion obtained, and their stability at the operating conditions employed. It is preferred that the silica-alumina catalyst contain at least about 50% silica up to about 95% silica. The synthetic type of alumina-silica catalyst, such as the coprecipitated alumina-silica and alumina precipitated on silica type are preferred. Popular synthetic gel cracking catalysts generally contain about 10 to 30% alumina. Two such catalysts are "Aerocat" which contains about 13% $Al_2O_3$, and "High Alumina Nalcat" which contains about 25% $Al_2O_3$, with substantially the balance being silica. The catalyst may be only partially of synthetic material; e.g. as may be made by precipitation of silica-alumina on an activated clay. One example of such catalysts contains about equal amounts of silica, alumina gel and clay.

The production of synthetic catalysts can be performed, for instance, (1) by impregnating silica with aluminum salts; (2) by direct combination of precipitated (or gelated) hydrated alumina and silica in appropriate proportions; or (3) by joint precipitation of alumina and silica from an aqueous solution of aluminum and silicon salts. Synthetic catalysts may be produced by the combination of hydrated silica with other hydrate bases as, for instance, zirconia, etc. These synthetic gel type catalysts are activated or calcined before use.

When following the above catalyst preparation procedures, for instance, (1) after impregnation, the resulting impregnated product is dried generally at a temperature within the range of about 170° F. to 400° F. for at least about 6 hours and up to 24 hours or more with a slow stream of air circulated to carry off the water vapor. The dried alumina catalyst mixture then may be formed by a tabletting or extruding operation. If the catalyst is to be in finely divided form, a grinding operation may follow drying. In the case of tabletting it is customary to incorporate a die lubricant which advantageously is organic and can be burned out by oxidation in the calcination step.

The pellets so obtained are suitable for subjection to high temperature treatment or calcination at a temperature between about 500° F. to 1400° F., usually about 700° F. to 1000° F., for a period of between about 2 and about 36 hours. While the calcination or heat treatment will generally be conducted in air, it is also feasible, although generally less desirable, to carry out the same in other oxidizing atmospheres, a reducing atmosphere such as for example, hydrogen or methane, or an inert atmosphere, such as nitrogen. In some instances, it may be desirable to carry out the calcination initially in a blend of air and nitrogen followed by heat treatment in an atmosphere of hydrogen.

The catalyst employed in the process of the present invention can be easily regenerated employing conventional procedures, for instance by subjecting it to an oxygen-containing gas at temperatures sufficient to burn off carbon deposited on the catalyst during the alkylation. This oxygen-containing gas, e.g., an oxygen-nitrogen mixture, can be air or contain about 0.01 weight percent to 5 or more weight percent oxygen but preferably contains about 0.5 to 1.5 weight percent oxygen and is introduced at a flow rate such that the maximum temperature at the site of combustion is below about 1000° F.

In accordance with the present invention, the steam-treated alkylation catalysts are advantageously employed to alkylate alkylatable aromatics with an alkylating agent. The aromatics, e.g., alkylatable aromatic hydrocarbons, suitable for alkylation in the present process include mono- and polycyclic aromatic hydrocarbon compounds such as benzene and its alkyl homologues e.g. toluene and the xylenes, naphthalene, and indane, which may be substituted or unsubstituted. The substituted aromatic compounds must, however, contain at least one hydrogen attached to the aromatic nucleus and are preferably methyl-substituted. These compounds may correspond to the general formula

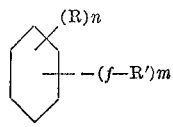

where R is an alkyl, including cyclo alkyl, radical containing generally from about 1 to 20, preferably from about 1 to 8, carbon atoms; $n$ is 0–5, preferably 1 to 3; R' is an aromatic hydrocarbon ring, preferably $C_4H_4$; —f— indicates a fused ring relationship (two carbon atoms common to two aromatic nuclei e.g. as in naphthalene); and $m$ is generally 0 to 1 or more. R may also be a divalent hydrocarbon group attached to the aromatic ring at two carbon atoms of the ring, e.g., alkylene, as in decalin and tetralin. The preferred aromatics, however, include benzene and alkyl benzenes corresponding to the above formula when $m$ is 0. The aromatic rings and R groups may be substituted as with phenyl, hydroxy, alkoxy, halide and other radicals which do not prevent the desired reaction. Suitable aromatic hydrocarbons include benzene, toluene, ortho-xylene, meta-xylene, para-xylene, ethyl-benzene, ortho-ethyltoluene, meta-ethyltoluene, para-ethyltoluene, 1,2,3-trimethylbenzene, 1,2,4-trimethylbenzene, 1,3,5-trimethylbenzene or mesitylene, normal propylbenzene, isopropylbenzene, etc. Higher molecular weight alkylaromatic hydrocarbons are also suitable as starting materials and include aromatic hydrocarbons such as are produced by the alkylation of aromatic hydrocarbons with olefin polymers. Such products are frequently referred to in the art as alkylate, and include hexylbenzene, nonylbenzene, dodecylbenzene, pentadecylbenzene, hexyltoluene, nonyltoluene, dodecyltoluene, pentadecyltoluene, etc. Very often alkylate is obtained as a high boiling fraction in which the alkyl group attached to the aromatic nucleus varies in size from about $C_9$ to about $C_{18}$. Other suitable alkylatable aromatic hydrocarbons include those with two or more aryl groups such as diphenyl, diphenylmethane, triphenyl, triphenylmethane, fluorene, stilbene, etc. Examples of other alkylatable aromatic hydrocarbons containing condensed benzene rings include naphthalene, alpha-methylnaphthalene, beta-methylnaphthalene, anthracene, phenanthrene, naphthacene, rubrene, etc.

The alkylating agents suitable for use in the present process include organic compounds containing an alkyl, including cycloalkyl, radical which is transferable to the aromatic nucleus. These compounds are aliphatic and include alkyl halides, alkanols and ethers generally containing from about 1 to 20 carbon atoms, preferably from about 1 to 6 carbon atoms, and also contain a radical, e.g., an hydroxyl or ether radical, which will displace a nuclear hydrogen of the aromatic through condensation. The alkylation agent is preferably saturated and frequently contains oxygen which produces water during the alkylation reaction.

A number of suitable alkylating agents correspond to the general formula $$R\text{---}O\text{---}R'$$

where R is a monovalent hydrocarbon radical such as alkyl, including cycloalkyl, usually lower alkyl and preferably containing 1 to 4 carbon atoms and R' is hydrogen or R, such as a lower alkyl radical and preferably containing 1 to 4 carbon atoms. The alkylating agents usually do not have more than about 18 carbon atoms, preferably up to about 12 carbon atoms. Specific alkylating agents include alkanols such as ethanol, propanol, isopropanol, pentanol, octanol and preferably methanol; and alkyl ethers such as dimethyl ether, diethyl ether and like members whether substituted with non-interfering groups or not. When the alkanols are employed, they may go through an intermediate ether stage. Examples of alkyl halides which may be used are of the formula RX, where R is as noted above and X is halogen and include ethyl chloride, normal propyl chloride, isopropyl chloride, normal butyl chloride, isobutyl chloride, secondary butyl chloride, tertiary butyl chloride, amyl chlorides, hexyl chlorides, etc., ethyl bromide, normal propyl bromide, isopropyl bromide, normal butyl bromide, isobutyl bromide, secondary butyl bromide, tertiary butyl bromide, amyl bromides, hexyl bromides, etc., ethyl iodide, normal propyl iodide, etc.

Methanol or dimethyl ether can be employed as the methylating agent. However, methanol holds an edge since dimethyl ether gives slightly lower utilization and higher carbon on the catalyst.

The alkylation reaction conditions used in the method of the present invention preferably include a temperature sufficient to maintain the aromatic and alkylating agent feeds in the vapor phase under the pressure employed. The temperature may be from about 400 to 1000° F., preferably from about 500 to 800° F. while the pressure may range from about ambient pressures or less up to about 2000 p.s.i.g., e.g. about 0 to 2000 p.s.i.g., and are preferably elevated pressures ranging from about 50 to 1000 p.s.i.g. The catalyst can be used as a fixed, moving or fluidized bed or in any other convenient type of handling system. The aromatic space velocity will in most cases be from about 0.1 to 10, preferably from about 0.1 to 5, weights of aromatic per weight of catalyst per hour (WHSV). The alkylating agent is generally employed in a molar ratio to the aromatic of about 0.1 to 4:1 and preferably of about 1 to 2:1. Diluent gases, e.g., inert or hydrocarbon, such as $H_2$, $N_2$ and $CH_4$ can also be utilized in the present process usually in the amounts ranging from a diluent gas to alkylating agent molar ratio from about 0.01 to 20:1 or more, preferably about 2 to 10:1.

The following examples will serve to illustrate the invention but they are not to be considered limiting.

*Example I*

The example was conducted according to the following procedure. A 1-inch internal diameter Universal stainless steel reactor heated by radiant heat and bronze-block furnace was employed. The temperature of the reactor was controlled by Fenwall thermostats and the temperature of the catalyst bed was measured by means of iron-constantan thermocouples located throughout the bed.

The aromatic and alkylating agents were blended in the indicated ratio and charged to the reactor from a graduated blowcase by nitrogen (diluent gas) placement. Both the diluent gas and liquid feed were metered to the reactor through Fischer-Porter rotameters.

The liquid products were separated from the effluent gases in a Jerguson liquid-level gauge and then released to atmospheric pressure at room temperature. The volume of dry gas was measured by means of a wet test meter and spot and continuous gas samples were taken. The gas samples were analyzed by mass spectrometer technique. Total hydrocarbon analyses were by vapor phase chromatography.

The following results of the tests of this example using essentially the procedure described above, are shown in Tables I and II. These tests were conducted to show the advantageous coke reduction and methanol utilization obtained when the steam-pretreated silica-alumina cracking catalyst of this invention was employed in an aging test when compared with known commercial methylation catalysts such as chrome beads. The tests were conducted at 700° F., 100 p.s.i.g., .35 WHSV, and 1:1 orthoxylene to methanol ratio. Table I shows that a virgin chrome bead cracking catalyst gave 58 percent methanol utilization with 3.4 percent coke yield on the feed. By comparison, at the same conditions, a steam-treated silica-alumina cracking catalyst having a surface area of about 202 m.²/gm. gave 59 percent methanol utilization with only 0.6 weight percent coke on feed. Table II presents the results of short aging tests showing methanol utilization of the virgin catalyst declined from 61 percent to 50 percent in a five hour period whereas the steam-treated catalyst showed no drop in utilization in the same period.

TABLE I

| Catalyst | Ave. Feed | Carbon No. Product | Methanol Utilization percent | Coke, Wt. percent on Feed |
|---|---|---|---|---|
| Chrome bead* | 7.96 | 8.54 | 58 | 3.4 |
| Steam treated silica-alumina cracking cat | 7.96 | 8.55 | 59 | 0.57 |

*The chrome bead catalyst contains about 88% SiO$_2$, 12% Al$_2$O$_3$ and a few tenths percent of Cr$_2$O$_3$.

TABLE II

| Catalyst | Methanol Utilization | | |
|---|---|---|---|
|  | 1 hr. | 3 hrs. | 5 hrs. |
| Chrome bead*, percent | 61 | 55 | 50 |
| Steam treated silica-alumina cracking cat., percent | 59 | 59 | 59 |

* See footnote, Table I.

*Examples II to VII*

Essentially the same procedure employed in Example I is followed except the alkylating agents and aromatics listed below in their respective example are substituted for the methanol and o-xylene respectively, of Example I.

| Example | Alkylating Agent | Aromatic |
|---|---|---|
| II | Dibutyl ether | Benzene. |
| III | Butanol | Naphthalene. |
| IV | Methanol | Indane. |
| V | t-Octanol | Toluene. |
| VI | t-Butyl chloride | o-Xylene. |
| VII | Methyl ether | o-Xylene. |

It is claimed:

1. A process of alkylating an alkylatable aromatic hydrocarbon with an alkylating agent comprising contacting in the vapor phase an alkylatable aromatic hydrocarbon corresponding to the structural formula:

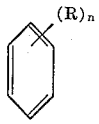

where R is an alkyl radical containing from about 1 to 8 carbon atoms and $n$ is 1 to 3 with an alkanol of 1 to 4 carbon atoms under alkylation conditions including a temperature of about 400 to 1000° F. and aromatic space velocity of 0.1 to 5 WHSV and an alkylating agent/aromatic molecular ratio of about 0.1 to 4:1 in the presence of an acidic alkylation catalyst consisting essentially of silica-alumina steam-treated at a temperature of about 1000 to 1600° F.

2. The method of claim 1 wherein the alkylation conditions include a temperature of about 500 to 800° F., an aromatic space velocity from about 0.5 to 5 WHSV, and an alkylating agent/aromatic molecular ratio of about 0.1 to 4:1, and the catalyst is steam-treated under conditions including a pressure of steam in air of from about 10 to 100% of the total pressure.

References Cited by the Examiner

UNITED STATES PATENTS

| 2,384,505 | 9/1945 | Thomas et al. | 260—671 |
| 2,408,167 | 9/1946 | Hepp | 260—671 |
| 2,542,190 | 2/1951 | Gorin et al. | 260—671 |
| 2,897,246 | 7/1959 | Keiser | 260—671 |

DELBERT E. GANTZ, *Primary Examiner.*

ALPHONSO D. SULLIVAN, *Examiner.*